United States Patent [19]

Shibaoka et al.

[11] Patent Number: 4,548,634
[45] Date of Patent: Oct. 22, 1985

[54] MOLD AND METHOD FOR PRODUCING MOLDED GLASS ARTICLES

[75] Inventors: Kazuo Shibaoka, Itami; Shunji Onishi; Takao Miwa, both of Nishinomiya; Toshio Akimoto, Kawanishi, all of Japan

[73] Assignee: Nippon Sheet Glass Co., Ltd., Osaka, Japan

[21] Appl. No.: 685,973

[22] Filed: Dec. 28, 1984

Related U.S. Application Data

[63] Continuation of Ser. No. 587,003, Mar. 7, 1984, abandoned.

[30] Foreign Application Priority Data

Mar. 9, 1983 [JP] Japan .................................. 58-38748
Sep. 28, 1983 [JP] Japan ................................. 58-179767
Oct. 24, 1983 [JP] Japan ................................. 58-198667

[51] Int. Cl.⁴ ............................................. C03B 11/07
[52] U.S. Cl. ............................................ 65/79; 65/76; 65/83; 65/85; 65/229
[58] Field of Search .................. 65/76, 79, 80, 83, 85, 65/229

[56] References Cited

U.S. PATENT DOCUMENTS

| 688,924 | 12/1901 | Blair et al. | 65/79 |
| 1,259,281 | 3/1918 | Peiler | 65/80 |
| 1,896,870 | 2/1933 | Smith | 65/76 |

FOREIGN PATENT DOCUMENTS 97772 9/1924 Austria ................................. 65/229

Primary Examiner—Arthur Kellogg
Attorney, Agent, or Firm—Wenderoth, Lind & Ponack

[57] ABSTRACT

A mold for producing a glass article having an opening and a protruding hollow portion, said mold comprising
(A) a female mold comprised of a main female mold member and an auxiliary female mold member, the inside shapes of the depressed portions of the two female mold members substantially defining the outside shape of the glass article,
(B) a male mold defining the inside shape of that part of the glass article, and
(C) a gas exhaust port formed in an inmost position of the depressed portion of the auxiliary female mold member, and/or
(D) a gas introducing port formed in the male mold in a position facing the depressed portion of the auxiliary female mold member.

And a method for producing the glass article by using the mold.

13 Claims, 9 Drawing Figures

MOLD AND METHOD FOR PRODUCING MOLDED GLASS ARTICLES

This application is a continuation, of application Ser. No. 587,003, filed Mar. 7, 1984, now abandoned.

BACKGROUND OF THE INVENTION

1. Field of the Invention

This invention relates to a mold and a method for producing molded glass articles. More specifically, it relates to a mold and a method for producing a molded glass article having an opening and a protruding hollow portion (to be sometimes referred to as a neck portion) which, in a front view of the article as viewed from its opening, is hidden or shown to protrude outwardly of the open circumferential wall portion of the glass article defining the aforesaid opening.

2. Description of the Prior Art

A conventional press-molding method comprising charging a molten mass of glass into the depressed portion of a female mold and pressing it by a male mold cannot give a glass article having an opening and a protruding hollow portion which, in a front view of the article as viewed from the opening in the pressing direction, is hidden or shown to protrude outwardly of the open circumferential wall portion of the glass article defining its opening, and can only produce glass articles having no such projecting portion. Glass articles having such a protruding hollow portion have therefore been produced by forming a main portion and a protruding portion separately by press forming, and thereafter bonding them to each other. This method is time-consuming and low in yield, and involves a high cost of production.

SUMMARY OF THE INVENTION

It is an object of this invention to provide a mold for producing a glass article having a protruding hollow portion, and a method of producing the glass article using the mold.

Another object of this invention is to provide a combined method of press molding and blow molding (and/or vacuum molding) which comprises forming a main portion of the aforesaid glass article by press-molding and then while the glass of the article is still soft and has formability, forming a protruding hollow portion of the glass article by applying blow molding and/or vacuum (suction) molding to part of the article, and a mold suitable for practicing this method.

Still another object of this invention is to provide a mold for producing a glass article of high quality, which includes means for cooling or sucking and fixing an open circumferential wall portion defining the opening of the glass article formed from molten glass and being still at high temperature before it is withdrawn from a mold, thereby preventing deformation which tends to occur at the open circumferential wall portion of the glass article at the time of removing the glass article from the mold, and a method including a step of preventing such deformation.

Other objects and advantages of this invention will become apparent from the following description.

According to this invention, the aforesaid glass article can be produced advantageously by a mold comprising (A) a female mold comprised of a main female mold member and an auxiliary female mold member, the inside shape of the depressed portion of the main female mold member substantially defining the outside shape of the glass article excepting said protruding portion, the inside shape of the depressed portion of the auxiliary female mold member substantially defining the outside shape of said protruding portion of the glass article, and said main and auxiliary female mold members being positioned in such a relationship that their depressed portions can be coupled to each other at the time of molding the glass article, (B) a male mold defining the inside shape of that part of the glass article which corresponds to its outside shape defined by the main female mold member, and (C) a gas exhaust port formed at an inmost position of the depressed portion of the auxiliary female mold member for discharging gases from said depressed portion, and/or (D) a gas introducing port formed in the male mold in such a position that it faces the depressed portion of the auxiliary female mold member when the male mold is inserted into the main female mold member.

DETAILED DESCRIPTION OF THE PREFERRED EMBODIMENTS

Figure 1:
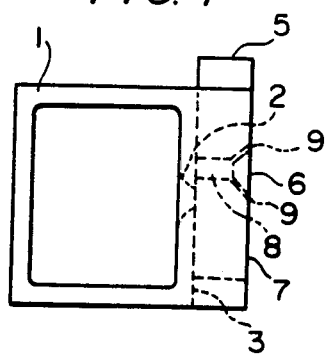
FIG. 1 is a rough front elevation showing one embodiment of the female mold used in the mold of this invention.

The mold of this invention is used for producing a glass article having an opening and a protruding hollow portion. In a front elevation of the glass article viewed from the opening of the article, the projecting hollow portion is hidden, or shown to protrude outwardly of the open circumferential wall portion of the glass article defining the aforesaid opening.

The protruding hollow portion of such a glass article cannot be produced by pressing a molten mass of glass in a female mold with a male mold. Such glass articles find extensive use as electrical component parts such as cathode ray tubes and electric bulbs and glass containers such as tableware and hygienic containers.

The mold of this invention has a male mold and a female mold comprised of a main female mold member and an auxiliary female mold member. It further includes at least one of a gas exhaust port formed at an inmost position of the depressed portion of the auxiliary female mold member and a gas introducing portion formed in the male mold at a position which faces the depressed portion of the auxiliary female mold member when the male mold is inserted into the main female mold.

The inside shape of the depressed portion of the main female mold substantially defines the outside shape of the glass article excepting the protruding hollow portion, and the inside shape of the depressed portion of the auxiliary female mold member substantially defines the outside shape of the protruding hollow portion of the glass article.

In the mold of this invention, the main female mold member and the auxiliary female mold member are positioned in such a relationship that the depressed portions of these members can be coupled to each other at a time of molding a glass article.

The male mold serves to press a molten mass of glass in the female mold to deform the glass mass along the inner wall of the depressed portion of the main female mold, and defines the inside shape of that part of the glass article which corresponds to the outside shape defined by the main female mold member.

The mold of this invention may be produced from a metallic material such as FC alloy, steel alloys, stainless metals or metals flame-sprayed with self-melting alloys, or a refractory material such as carbon, graphite or boron nitride. When the mold is made from a metallic material, the inside surface of the depressed portion of the mold is preferably coated with a fine powder of boron nitride in order to improve its mold releasability and lubricity with regard to the glass article. When the mold is made of a refractory material, the surface of the glass article is finished in a good gloss because the refractory material itself has excellent self-lubricity and mold releasability at high temperatures. Boron nitride is a convenient material for the mold because it can be used in an air atmosphere.

In a preferred embodiment of the mold of this invention, the auxiliary female mold member includes a closing portion for releasing the coupling between the depressed portion of the main female mold member and the depressed portion of the auxiliary female mold member and closing the depressed portion of the main female mold member at a position at which it has released the coupling. The auxiliary female mold member in this embodiment is combined with the main female mold member in such a relation that it can slide with respect to the main female mold member. Coupling of the depressed portion of the main female mold member to the depressed portion of the auxiliary female mold member and releasing of the coupling resulting in closing the depressed portion of the main female mold can be achieved easily by simply sliding the auxiliary female mold member with respect to the main female mold member.

In another embodiment, a shutter is provided in a boundary part between the depressed portion of the main female mold member and the depressed portion of the auxiliary female mold member, and by raising and lowering the shutter, the two depressed portions can be coupled to each other, or the coupling of these can be released to close the depressed portions.

For production of the glass article described above by using the mold described above, the present invention provides a method which comprises (1) charging a predetermined amount of molten glass mass into the depressed portion of a main female mold member of a female mold comprised of the main female mold member and an auxiliary female mold in which the coupling between the depressed portion of the main female mold member and the depressed portion of the auxiliary female mold member has been released and at this position of release, the depressed portion of the main female mold member has been closed, (2) press-molding the molten glass mass in the depressed portion of the main female mold by the male mold to define the outside and inside shapes of that part of the glass article which is substantially other than said protruding hollow portion, (3) positioning the auxiliary female mold member at a position at which its depressed portion is located opposite to the depressed portion of the main female mold member, and (4) thereafter sucking and discharging gases from the depressed portion of the auxiliary female mold member through a gas exhaust port formed at an inmost position of said depressed portion and/or introducing a gas thereinto through a gas introducing port provided in the male mold at a position facing the depressed portion of the auxiliary female mold member, whereby the outside shape of that part of the glass article which substantially corresponds to its protruding hollow portion is defined by the inside shape of the depressed portion of the auxiliary female mold.

According to the method of this invention, the protruding portion of the glass article is formed by sucking and discharging gases from the gas exhaust port of the auxiliary female mold member and/or introducing a gas from the gas introducing port of the male mold, as described in step (4) above. When either one of these procedures is to be employed, the procedure of sucking and discharging gases from the gas exhaust port of the auxiliary female mold is preferred to the procedure of introducing a gas from the gas introducing port of the male mold because the former tends to make the thickness of the projecting portion of the glass article more uniform.

In a preferred embodiment of this invention, the mold of this invention has a gas flow passage opened at a position which defines the open circumferential wall portion of the glass article. The gas flow passage may by provided in the main female mold member at a position which defines the outside shape of the open circumferential wall portion of the glass article, or in the male mold at a position which defines the inside shape of the open circumferential wall of the glass article, or in both.

When the mold of this invention including the gas flow passage is used, the glass article at high temperature formed in the mold can be very advantageously fixed before withdrawal from the mold by sucking or sending gases from or into the opening of the gas flow passage. This prevents the open circumferential wall portion of the glass article at high temperature from being deformed after withdrawal from the mold.

For example, when the mold having the gas flow passage at the main female mold member is used, the open circumferential portion of the glass article at high temperature can be cooled by introducing a gas from the opening of the gas flow passage. Furthermore, the open circumferential portion of the glass article at high temperature can be attracted to and fixed at the corresponding inner wall of the depressed portion of the main female mold. When the mold having the gas flow passage at the male mold is used, the open circumferential wall portion can be cooled by sending a gas from the opening of the gas flow passage. When the mold having the gas flow passages at both of the main female mold member and the male mold, the opening circumferential wall portion of the glass article can be cooled by introducing a gas from the opening of at least one of the gas flow passages.

The invention will be more fully understood from the following description of specific embodiments taken in conjunction with the accompanying drawings.

Figure 2:
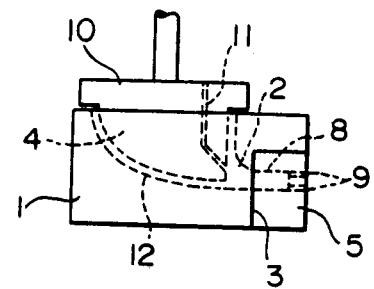
FIG. 2 is a rough side elevation showing the state of the male mold being inserted in the female mold of FIG. 1.

FIGS. 1 and 2 show a female mold 1 for forming the principal part of a glass article, and a sliding member 5 including an auxiliary female mold member 6 and a closing portion 7. The sliding member 5 can slide with respect to the main female mold member 1 along the sliding surface 3 of the main female mold member 1. Sliding of the sliding member 5 places a connecting space 2 forming part of the depressed portion 4 of the main female mold member 1 into coupling to the depressed portion 8 of the auxiliary female mold member 6. Furthermore, as shown in FIG. 1, the connecting space 2 of the main female mold member 1 may be closed by the closing portion 7 by releasing the coupling of the connecting space 2 of the main female mold 1 to the depressed portion 8 of the auxiliary female mold 6.

There is also shown a male mold 10 having a shape corresponding to the inside shape of the main part of the glass article (excepting that part which is opposite to the connecting portion 2). The depressed portion 4 of the main female mold member 1 has a molding surface having a shape corresponding to the outside shape of the main part of the glass article. The auxiliary female mold member 6 has formed therein a depressed portion 8 having a molding surface of a shape corresponding to the outside shape of the neck portion of the glass article and a plurality of gas exhaust ports 9 at inmost positions of the depressed portion 8. In the male mold 10 is provided a gas introducing inlet 11 directed to the depressed portion 8 of the auxiliary female mold member 6 in a state in which the male mold 10 is inserted in the main female mold 1 (FIG. 2). The main female mold member 1, the sliding member 5 including the auxiliary female mold member 6 and the male mold 10 are made of boron nitride.

Figure 3:
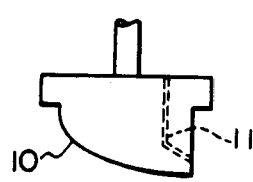
FIG. 3 is a side elevation of the male mold shown in FIG. 2.
Figure 4:
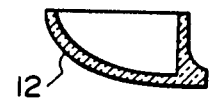
FIG. 4 is a view showing the cross-sectional shape of a glass article at high temperature formed by press molding molten glass in the main female mold using the mold of the invention shown in FIGS. 1 to 3.
Figure 5:
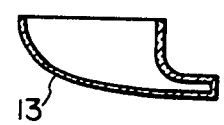
FIG. 5 is a view showing the cross-sectional shape of a glass article having a protruding hollow portion formed by subjecting the glass article at high temperature shown in FIG. 4 to blow molding and/or vacuum molding.

As shown in FIG. 1, the sliding member 5 is moved to a position at which the connecting space 2 of the main female mold member 1 is closed by the closing member 7, and a moldable mass of glass having a wide temperature range such as lead glass, which has been melted and weighed, is put into the depressed portion 4 of the main female mold member 1. Then, the molten glass mass is pressed by the male mold 10 as shown in FIG. 3 to mold it into a glass article 12 which has the shape shown in FIG. 4 corresponding to the main portion of a final glass article and is still at a high temperature. In the next place, the sliding member 5 is caused to slide by an air cylinder (not shown) to bring the connecting space 2 of the depressed portion 4 of the main female mold member 1 into alignment with the depressed portion 8 of the auxiliary female mold member 6. By an exhaust device (not shown) communicating with the exhaust ports 9, the pressure of the depressed portion 8 is reduced to below 150 torr and at the same time, air is blown by a blower (not shown) communicating with the gas inlet ports 11 provided in the male mold 10. As a result, a glass article 13 having the projecting portion shown in FIG. 5 is formed by molding that part of the glass article 12 (FIG. 4) at a temperature of at least about 700° C., preferably at least 800° C., which corresponds to the neck portion of the final glass article 13 into the inner shapes of the depressed portion 2 and the depressed portion 8. The glass article is then cooled within the mold to about 600° C. or below. The male mold 10 is removed and then the main male mold member 1 and the auxiliary female mold member 6 are split. The glass article is withdrawn and its distortion is removed.

Figure 6:
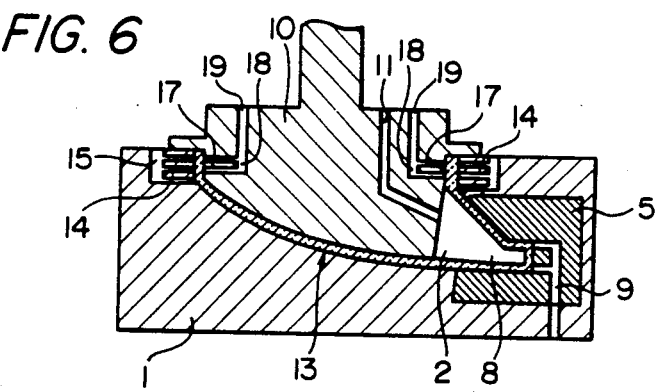
FIG. 6 is a sectional view of another mold of the invention viewed from its side in which both the main female mold member and the male mold have gas flow passages 14 and 17 respectively at positions corresponding to the open circumferential wall portion of the glass article.
Figure 7:
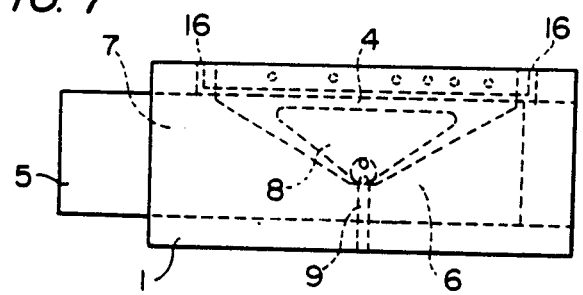
FIG. 7 is a sectional view of the female mold in FIG. 6 taken from a different side surface from FIG. 6.
Figure 8:
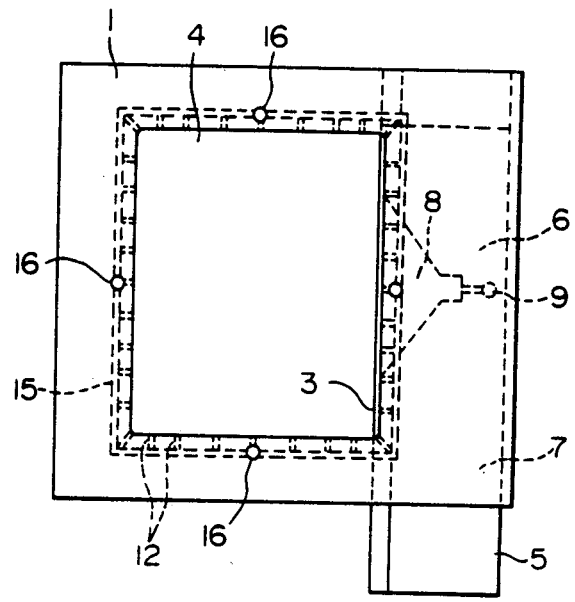
FIG. 8 is a front elevation of the female mold illustrated in FIG. 7.

FIGS. 6 to 8 show another embodiment of the mold of this invention. In these drawings, the same reference numerals show the same parts as in FIGS. 1 to 3. The mold shown in FIGS. 6 to 8 greatly differ from the mold shown in FIGS. 1 to 3 in that the former includes the sliding member 5 and the auxiliary female mold member 6 in the main female mold member 1; that the main female mold member 1 of the former has gas flow passages 14 and 15 in that part which defines the open circumferential wall portion of the glass article 13; and that the male mold 10 of the former has similar gas flow passages 17 and 18 at that part which defines the open circumferential wall portion of the glass article 13. Otherwise, the mold shown in FIGS. 6 to 8 does not basically differ from that shown in FIGS. 1 to 3.

Referring to FIGS. 6 to 8, the main female mold member 1 has a number of gas flow passages 14 having a diameter of less than about 1.0 mm along the entire circumference of its inside molding surface which defines the open circumferential wall portion of the glass article. These gas flow passages 14 communicate with a common gas flow passage 15 provided inside the main female mold member 1 and along the entire circumference of its molding surface. The flow passage 15, in turn, communicates with four air supply ports 16 formed in the upper surface of the main female mold member 1. Compressed air, for example, is supplied from the main female mold member 1. The male mold 10, like the main female mold member 1, has gas flow passages 17 having a diameter of less than about 1.0 mm along the entire circumference of its outside molding surface defining the open circumferential wall portion of the glass article. The gas flow passages 17 communicate with a common gas flow passage 18 which is provided along the entire inside circumference of the male mold 10 and communicates with four air supply ports 19 in the upper surface of the male mold 10. With the mold shown in FIGS. 6 to 8, the open circumferential wall portion of the glass article 13 is cooled by sending an inert gas such as compressed air from the air supply ports 16 and 19 of the main female mold member 1 and the male mold 10 for a period of, for example, several seconds during which the molten glass mass is molded by the main female mold member 1 and the male mold 10 before the glass article at high temperature is withdrawn from the mold.

Preferably, the gas is discharged while the molten glass mass is pressed by the male mold and/or the main female mold member. If the amount of the gas discharged is less than $1.8 \times 10^{-3}$ m$^3$/sec for every cm$^2$ of that surface which is to be cooled and the speed of press forming is fast, the glass cannot be fully cooled before the male mold is pulled out. Consequently, the soft glass still at a high temperature deforms by its own weight, or deformation occurs owing to the difference in shrinkage that arises from the difference in the rate of cooling between that part which is in contact with the main female mold and that part which is in contact with the outer atmosphere. Accordingly, the amount of the gas discharged is preferably adjusted to at least $1.8 \times 10^{-3} m^3/sec$ for every $cm^2$ of that surface which is to be cooled. On the other hand, if the amount of the gas discharged is at least $1.0 \times 10^{-1} m^3/sec$ for every $cm^2$ of that surface which is to be cooled, that surface of the glass which is near the gas discharge opening tends to be deformed by the blowing of the gas. Thus, the amount of the gas discharged is preferably adjusted to not more than $1.0 \times 10^{-1} m^3/sec$ for every $cm^2$ of that surface which is to be cooled.

By so cooling the surface of the open circumferential wall portion of the glass article with a gas, the deformation of the glass article 13 including warping can be prevented. Without cooling, the open end surface of he glass article tends greatly to sag to a length of more than about 3 mm and thus undergo deformation.

In the mold shown in FIGS. 6 to 8, the gas flow passages 14 and 17 have openings having a diameter of not more than about 1 mm. Those portions of the main female mold member and the male mold which define the open circumferential wall portion of the final glass article may be made of a porous material, for example porous carbon, a porous sintered metal, or a mixed porous sintered body of a refractory and a metal.

In the above description of the method of manufacturing the glass article by the mold shown in FIGS. 6 and 8, the surface of the open circumferential wall portion of the glass article is cooled by discharging a gas from both the main female mold member 1 and the male mold 10. It will be easily understood by those skilled in the art that this discharging of the gas may be carried out at either one of the main female moled member 1 and the male mold 10.

Figure 9:
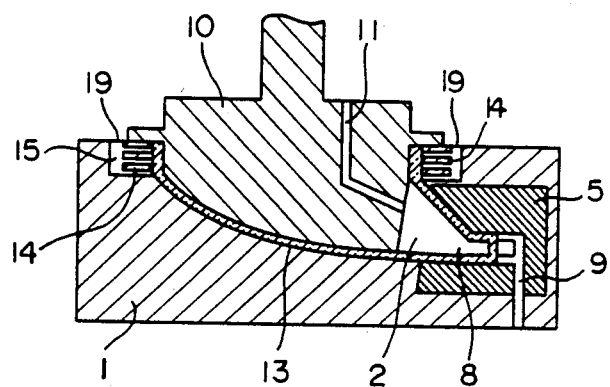
FIG. 9 is a sectional view of still another mold in accordance with this invention as viewed from its side surface, in which only the main female mold has a gas flow passage 14 at a position corresponding to the open circumferential wall portion of the glass article.

FIG. 9 shows another embodiment of the mold of this invention which differs from the mold shown in FIG. 6 in that the male mold does not have a gas flow passage at a position which defines the open circumferential wall portion of the final glass article. By using the mold of FIG. 9, the open circumferential wall portion of the glass article 13 is fixed to the inside wall of the mold which defines the open circumferential portion of the glass article by, for example, sucking the air inside the gas flow passage 14 by a vacuum pump (not shown) communicating with an opening 19. The vacuum sucking force may be applied immediately after the molten glass mass has been press-formed by the male mold. Preferably, it is applied almost simultaneously with the removal of the male mold after the press-molding.

More preferably, while the molten glass mass is press-molded by the main female mold member and the male mold, the surface of the open circumferential wall portion of the press-molded article is cooled by discharging air from the gas flow passage 14 existing in the inside surface of the main female mold member which corresponds to the surface of the open circumferential wall portion of the glass article, and almost as soon as the male mold is removed, the vacuum sucking force is applied to the surface of the aforesaid open circumferential wall portion.

The material of which the portion having the gas flow passage 14 is made and the amount of the gas discharged may be the same as those described above with reference to FIGS. 6 to 8.

When the glass article has a relatively small wall thickness, application of only the vacuum sucking force can lead to the cooling of the open circumferential wall portion to such an extent that it withstands deformation. On the other hand, when the wall thickness of the glass article is relatively large, the discharging of the gas and the vacuum suction are preferably carried out simultaneously. Accordingly, the sagging of the open end surface of the molded glass article can be prevented as desribed above with reference to FIGS. 6 to 8.

What we claim is:

1. A mold for producing a glass article having an opening and a protruding hollow portion which, in a front elevation of the glass article as viewed from said opening, is either hidden or shown to protrude outwardly of the open circumferential wall portion of the glass article defining said opening, said mold comprising
   (A) a female mold comprised of a main female mold member having a depressed portion and an auxiliary female mold member having a depressed portion, the inside shape of the depressed portion of the main female mold member substantially defining the outside shape of the glass article excepting said protruding portion, the inside shape of the depressed portion of the auxiliary female mold member substantially defining the outside shape of said protruding portion of the glass article, and said main and auxiliary female mold members being positioned in such a relationship that their depressed portions can be coupled to each other at the time of molding the glass article,
   (B) a male mold defining the inside shape of that part of the glass article which corresponds to its outside shape defined by the main female mold member, and
   (C) a gas exhaust port formed at an inmost position of the depressed portion of the auxiliary female mold member for discharging gases from said depressed portion, and/or
   (D) a gas introducing port formed in the male mold in such a position that it faces the depressed portion of the auxiliary female mold member when the male mold is inserted into the main female mold member.

2. A mold of claim 1 wherein the auxiliary female mold member includes a closing portion which releases the coupling between the depressed portion of the main female mold member and the depressed portion of the auxiliary female mold member and at a position at which it has released the coupling, closes the depressed portion of the main female mold member.

3. A mold of claim 2 wherein the main female mold member further has a gas flow passage opened at that position which defines the outside shape of the open circumferential wall portion of the glass article.

4. A mold of claim 2 wherein the male mold further has a gas flow passage opened at that position which defines the inside shape of the open circumferential wall portion of the glass article.

5. A mold of claim 2 wherein the main female mold further has a gas flow passage opened at that position which defines the outside shape of the open circumferential wall portion of the glass article, and the male mold further has a gas flow passage opened at that position which defines the inside shape of the open circumferential wall portion of the glass article.

6. A mold of claim 1 wherein the main female mold member further has a gas flow passage opened at that position which defines the outside shape of the open circumferential wall portion of the glass article.

7. A mold of claim 1 wherein the male mold further has a gas flow passage opened at that position which defines the inside shape of the open circumferential wall portion of the glass article.

8. A mold of claim 1 wherein the main female mold further has a gas flow passage opened at that position which defines the outside shape of the open circumferential wall portion of the glass article, and the male mold further has a gas flow passage opened at that position which defines the inside shape of the open circumferential wall portion of the glass article.

9. A method for producing a glass article having an opening and a protruding hollow portion which, in a front elevation of the glass article as viewed from its opening, is either hidden or shown to protrude outwardly of the open circumferential wall portion of the glass article defining said opening, said method comprising (1) charging a predetermined amount of molten glass mass into a depressed portion of a main female mold member of a female mold, said female mold being comprised of the said main female mold and an auxiliary female mold which also has a depressed portion, the said charging being conducted when the depressed portion of the main female mold and the depressed portion of the auxiliary female mold are not coupled, (2) press-molding the molten glass mass in the depressed portion of the main female mold by the male mold to define the outside and inside shapes of that part of the glass article which is substantially other than said protruding hollow portion, (3) positioning the auxiliary female mold member at a position at which its depressed portion is coupled to the depressed portion of the main female mold member, and (4) thereafter sucking and discharging gases from the depressed portion of the auxiliary female mold member through a gas exhaust port formed at an inmost position of said depressed portion and/or introducing a gas thereinto through a gas introducing port provided in the male mold at a position facing the depressed portion of the auxiliary female mold member, whereby the outside shape of that part of the glass article which substantially corresponds to its protruding hollow portion is defined by the inside shape of the depressed portion of the auxiliary female mold.

10. A method of claim 9 wherein the main female mold member has a gas flow passage opened at that position which defines the outside shape of the open circumferential wall portion of the glass article, and before the glass article at high temperature formed in the mold is withdrawn from the mold, a gas is sent into the mold from the openings of the gas flow passage to cool the open circumferential wall portion.

11. A method of claim 9 wherein the main female mold has a gas flow passage opened at that position which defines the outside shape of the open circumferential wall portion of the glass article, and before the glass article at high temperature formed in the mold is withdrawn from the mold, its open circumferential wall portion is sucked and fixed to the corresponding inside wall within the depressed portion of the main female mold member by sucking a gas from the openings of the gas flow passage.

12. A method of claim 9 wherein the male mold has a gas flow passage opened at that position which defines the inside shape of the open circumferential wall portion of the glass article, and before the glass article at high temperature formed in the mold is withdrawn from the mold, its open circumferential wall portion is cooled by sending a gas from the openings of the gas flow passage.

13. A method of claim 9 wherein the female mold has a gas flow passage opened at that position which defines the outside shape of the open circumferential wall portion of the glass article, and the male mold has a gas flow passage opened at that position which defines the inside shape of the open circumferential wall portion of the glass article, and before the glass article at high temperature formed in the mold is withdrawn from the mold, its open circumferential wall portion is cooled by sending a gas from the openings of said two gas flow passages.

* * * * *